(12) United States Patent
Inoue

(10) Patent No.: US 9,740,443 B2
(45) Date of Patent: Aug. 22, 2017

(54) PRINTING APPARATUS CAPABLE OF PERFORMING NEAR FIELD WIRELESS COMMUNICATION, METHOD FOR CONTROLLING PRINTING APPARATUS, AND STORAGE MEDIUM

(71) Applicant: CANON KABUSHIKI KAISHA, Tokyo (JP)

(72) Inventor: Go Inoue, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/804,092

(22) Filed: Jul. 20, 2015

(65) Prior Publication Data

US 2016/0026417 A1 Jan. 28, 2016

(30) Foreign Application Priority Data

Jul. 24, 2014 (JP) ................................. 2014-151204

(51) Int. Cl.
*G06F 3/12* (2006.01)
*H04N 1/00* (2006.01)
*H04B 5/00* (2006.01)

(52) U.S. Cl.
CPC .......... *G06F 3/1236* (2013.01); *G06F 3/1206* (2013.01); *G06F 3/1292* (2013.01); *H04B 5/00* (2013.01); *H04N 1/00342* (2013.01); *H04B 5/0056* (2013.01); *H04N 2201/006* (2013.01); *H04N 2201/0082* (2013.01)

(58) Field of Classification Search
None
See application file for complete search history.

(56) References Cited

U.S. PATENT DOCUMENTS

| | | | |
|---|---|---|---|
| 7,742,183 B2* | 6/2010 | Sato | G06K 15/00 358/1.13 |
| 8,189,225 B1* | 5/2012 | Lo | G06F 3/122 358/1.15 |
| 8,566,426 B2* | 10/2013 | Ooba | H04L 29/12254 370/392 |
| 8,749,823 B2* | 6/2014 | Kato | G06F 3/1222 358/1.14 |
| 8,958,100 B2* | 2/2015 | Nishikawa | H04W 4/008 358/1.14 |

(Continued)

FOREIGN PATENT DOCUMENTS

| | | |
|---|---|---|
| CN | 102256035 A | 11/2011 |
| CN | 102356627 A | 2/2012 |

(Continued)

*Primary Examiner* — Dung Tran
(74) *Attorney, Agent, or Firm* — Canon USA Inc., IP Division

(57) ABSTRACT

When a print processing apparatus is not connected to a printing apparatus, the printing apparatus generates communication information using an IP address of the printing apparatus and writes the generated communication information into a memory of an NFC communication unit. When the print processing apparatus is connected to the printing apparatus, the printing apparatus generates communication information using an IP address of the print processing apparatus and writes the generated communication information into the memory of the NFC communication unit.

5 Claims, 6 Drawing Sheets

(56) References Cited

U.S. PATENT DOCUMENTS

| | | | | |
|---|---|---|---|---|
| 8,982,401 B2* | 3/2015 | Itogawa | ............... | G06F 3/1292 358/1.14 |
| 9,172,826 B2* | 10/2015 | Kadota | ............... | H04N 1/0009 |
| 2010/0315678 A1* | 12/2010 | Smires | ............... | G06Q 20/223 358/1.15 |
| 2011/0292445 A1* | 12/2011 | Kato | ............... | G06F 3/1222 358/1.15 |
| 2012/0264372 A1* | 10/2012 | Chen | ............... | G06F 3/1204 455/41.1 |
| 2013/0094047 A1* | 4/2013 | Bailey | ............... | H04L 63/18 358/1.14 |
| 2013/0215467 A1* | 8/2013 | Fein | ............... | G06F 3/1204 358/1.15 |
| 2013/0229687 A1* | 9/2013 | Yamauchi | ............... | G06F 3/1204 358/1.15 |
| 2013/0258382 A1* | 10/2013 | Sato | ............... | H04N 1/00106 358/1.13 |
| 2013/0322296 A1* | 12/2013 | Arunan | ............... | H04L 61/20 370/254 |
| 2014/0063537 A1* | 3/2014 | Nishikawa | ............... | H04W 4/008 358/1.15 |
| 2014/0268231 A1* | 9/2014 | Ito | ............... | G06F 3/1292 358/1.15 |
| 2014/0355047 A1* | 12/2014 | Lee | ............... | G06F 3/1292 358/1.15 |
| 2015/0111493 A1* | 4/2015 | Berkema | ............... | H04W 8/005 455/41.1 |
| 2016/0142581 A1* | 5/2016 | Morita | ............... | H04N 1/33376 358/1.13 |

FOREIGN PATENT DOCUMENTS

| | | |
|---|---|---|
| CN | 102741802 A | 10/2012 |
| CN | 103312926 A | 9/2013 |
| EP | 2709339 A1 | 3/2014 |
| JP | 2002-312140 A | 10/2002 |
| JP | 2013-250940 A | 12/2013 |

* cited by examiner

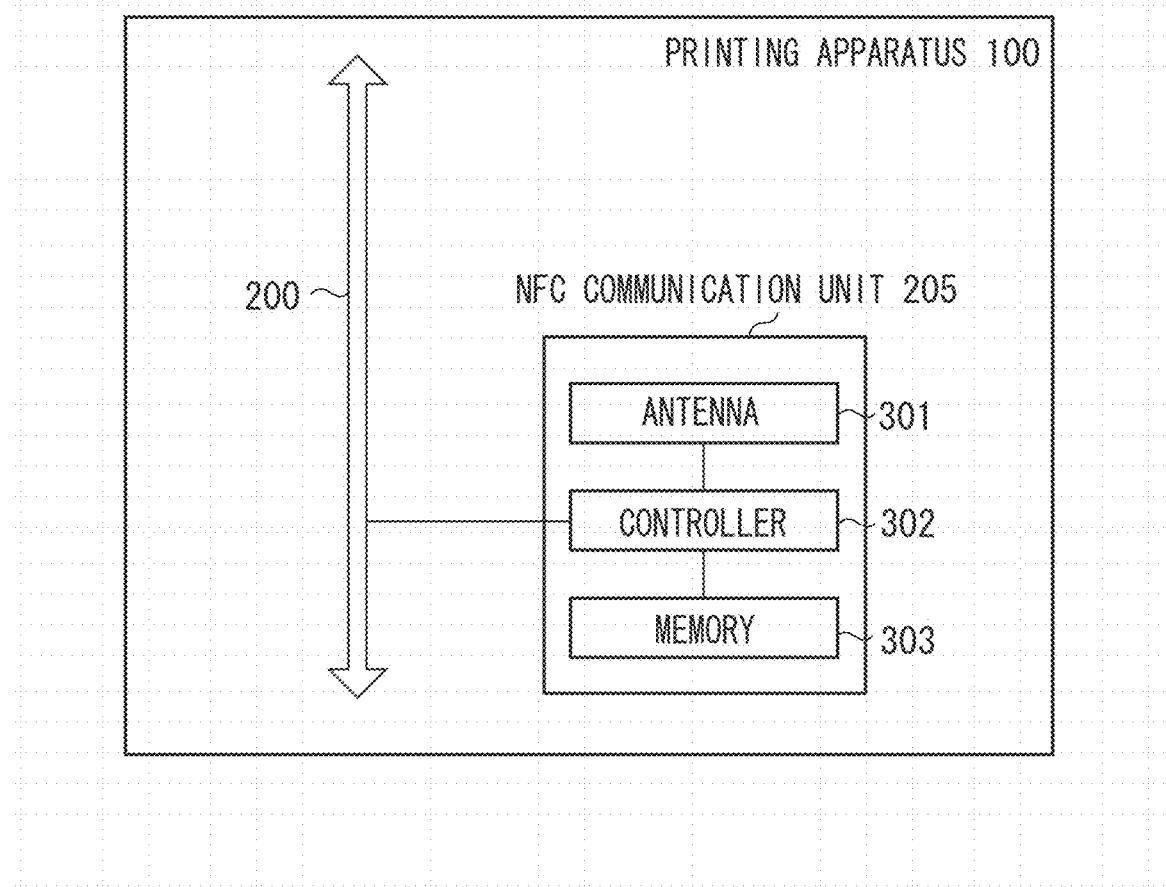

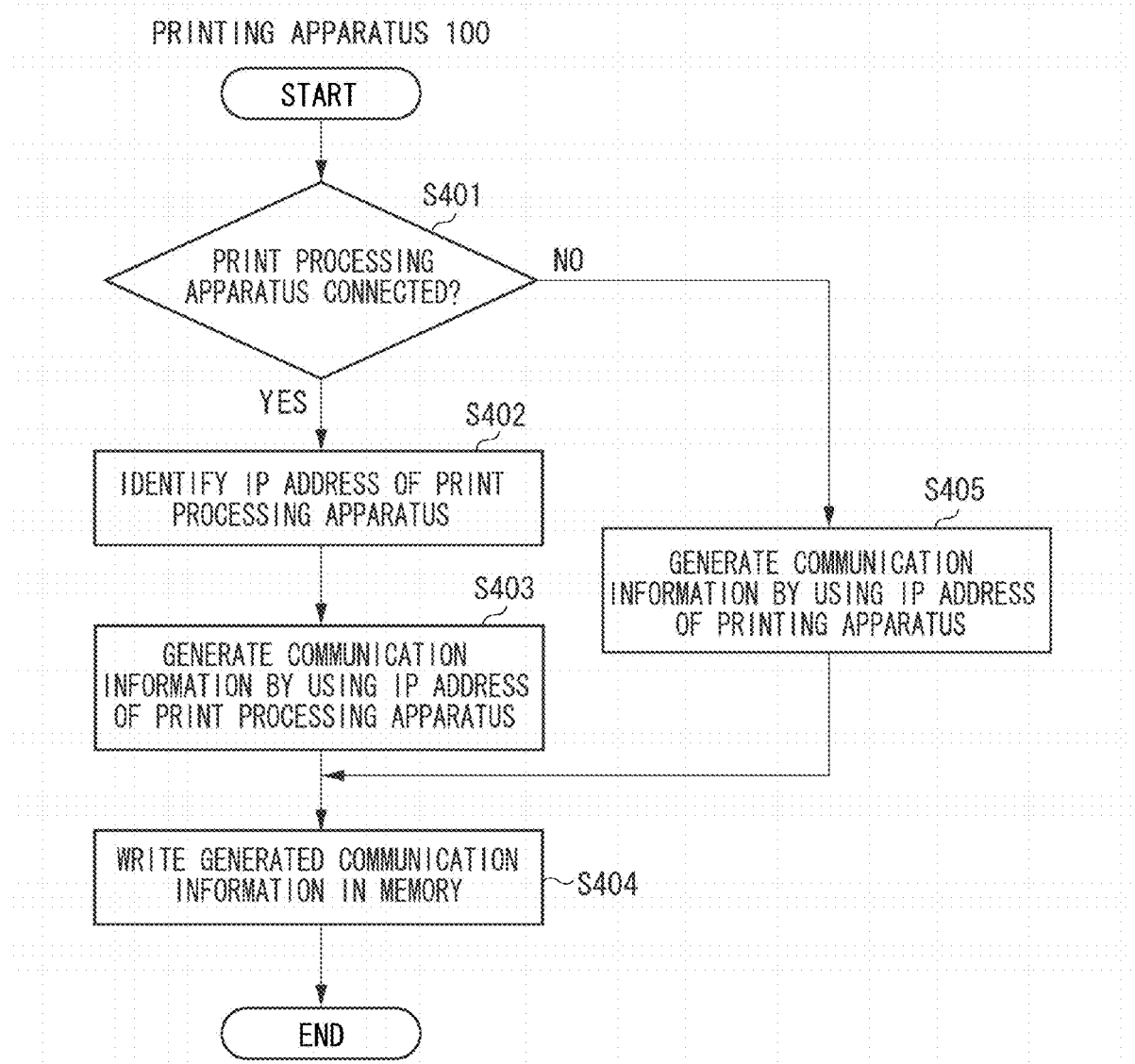

SETTING SCREEN 500

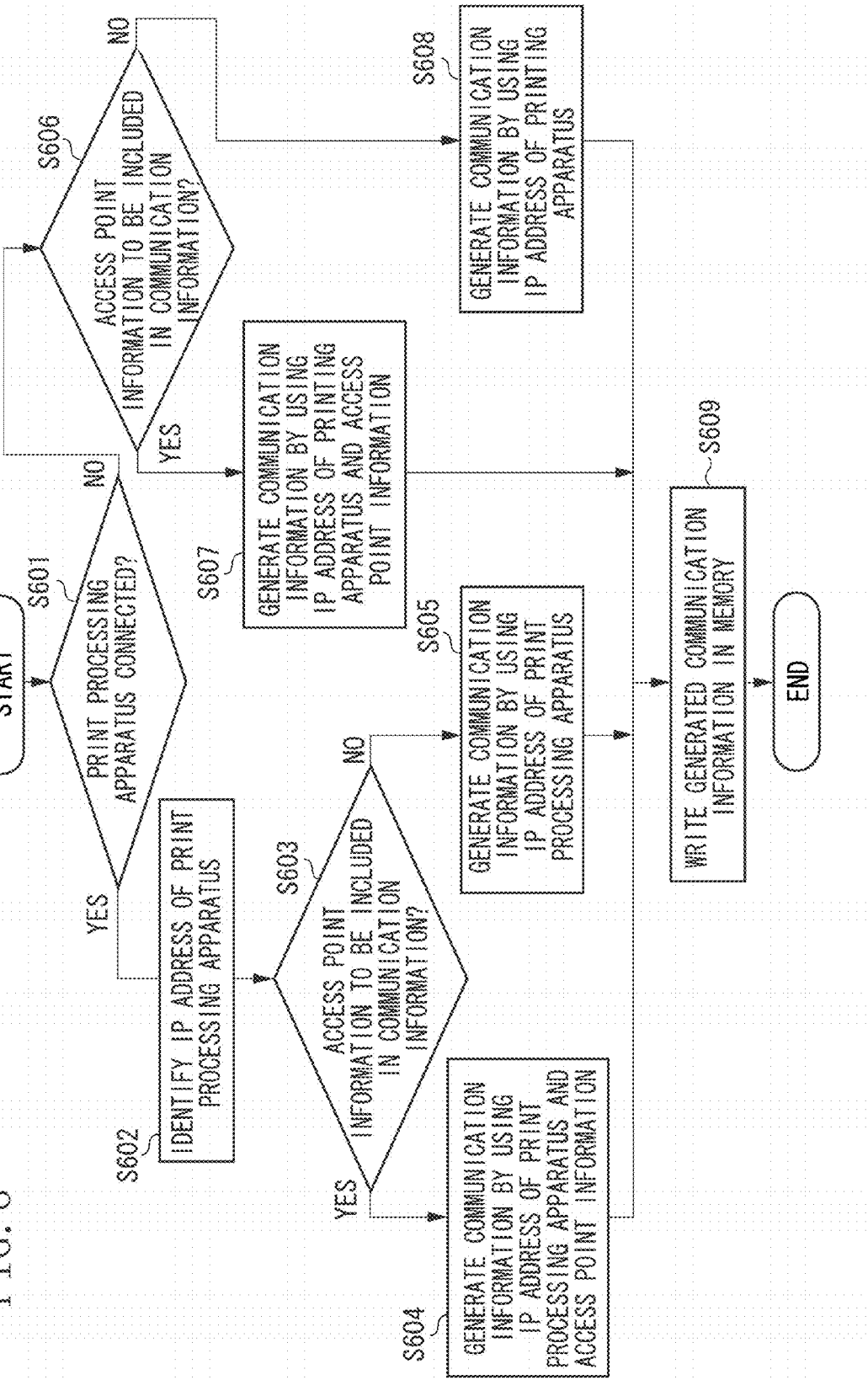

PRINTING APPARATUS CAPABLE OF PERFORMING NEAR FIELD WIRELESS COMMUNICATION, METHOD FOR CONTROLLING PRINTING APPARATUS, AND STORAGE MEDIUM

BACKGROUND

Field

Aspects of the present invention generally relate to a printing apparatus that performs near field wireless communication, a method for controlling the printing apparatus, and a storage medium.

Description of the Related Art

Some printing apparatuses such as multifunction peripherals and printers are provided with a near field wireless communication function such as Near Field Communication (NFC).

In the case of printing apparatuses, NFC may be used for the purpose of pairing and handover. When a user of a portable terminal having a NFC function brings the portable terminal close to a printing apparatus, the printing apparatus transmits, for example, the Internet Protocol (IP) address of the printing apparatus as communication information to the portable terminal via NFC. The portable terminal switches the method of communication with the printing apparatus from NFC to other communication method such as Wireless Fidelity (Wi-Fi), and transmits print data to a destination specified by the IP address included in the communication information. This enable the user of the portable terminal to acquire the communication information required to transmit print data to the printing apparatus through a simple operation of bringing the portable terminal close to the printing apparatus.

Meanwhile, as discussed in Japanese Patent Application Laid-Open No. 2002-312140, connecting a print processing apparatus to a printing apparatus is also known as a printing apparatus operation form. The print processing apparatus is able to interpret Page Description Language (PDL) not supported by the printing apparatus alone. The print processing apparatus interprets print data, converts the interpreted print data into a format supported by the printing apparatus, and transmits the resultant print data to the printing apparatus. Connecting the print processing apparatus to the printing apparatus enables the user to perform printing by using print data in various formats.

When the print processing apparatus is connected to the printing apparatus, the print processing apparatus first receives print data transmitted from an external apparatus such as a portable terminal. Then, the print processing apparatus processes the print data and then transmits the processed print data to the printing apparatus. More specifically, when the print processing apparatus is connected to the printing apparatus, the external apparatus such as a portable terminal needs to transmit the print data not to the printing apparatus but to the print processing apparatus.

However, when the print processing apparatus is connected to the printing apparatus, the print data transmitted from the external apparatus may not reach the print processing apparatus depending on the contents of the communication information transmitted from the printing apparatus to the external apparatus via NFC. For example, suppose that, when the print processing apparatus is connected to the printing apparatus, the printing apparatus transmits the IP address of the printing apparatus itself to the external apparatus via NFC. In this case, since the destination of the print data is not the print processing apparatus but the printing apparatus, the print data transmitted from the external apparatus will not be sent to the print processing apparatus. As a result, the user is not able to perform printing as desired.

SUMMARY

Aspects of the present invention are generally directed to suitably switching information to be transmitted to an external apparatus via near field wireless communication such as NFC between a case where a print processing apparatus is connected to a printing apparatus and a case where the printing processing apparatus is not connected to the printing apparatus.

According to an aspect of the present invention, a printing apparatus includes a near field wireless communication unit, including a memory, configured to perform near field wireless communication, a printing unit configured to perform print processing, a determination unit configured to determine whether a print processing apparatus for processing print data is connected to the printing apparatus, and a writing unit configured to write information in the memory included in the near field wireless communication unit. The writing unit writes an address of the print processing apparatus in the memory in a case where the determination unit determines that the print processing apparatus is connected to the printing apparatus or writes an address of the printing apparatus in the memory in a case where the determination unit determines that the print processing apparatus is not connected to the printing apparatus.

Further features of the present disclosure will become apparent from the following description of exemplary embodiments with reference to the attached drawings.

BRIEF DESCRIPTION OF THE DRAWINGS

FIG. 3 illustrates a configuration of a Near Field Communication (NFC) wireless communication unit.

FIG. 4 is a flowchart illustrating processing for generating communication information.

FIG. 6 is a flowchart illustrating processing for generating communication information.

DESCRIPTION OF THE EMBODIMENTS

An exemplary embodiment will be described below with reference to the accompanying drawings. The following exemplary embodiments are not seen to be limiting. Not all of the combinations of the features described in the exemplary embodiments are indispensable to the solutions for the present disclosure.

Figure 1A:
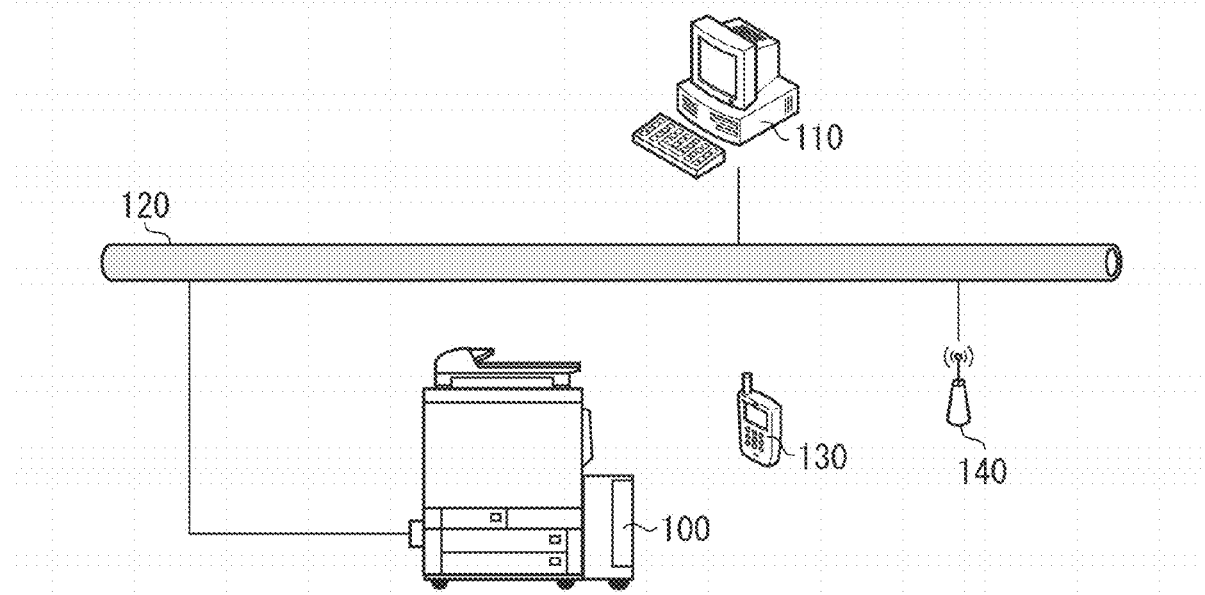
FIGS. 1A and 1B illustrate configurations of a printing system.
Figure 1B:
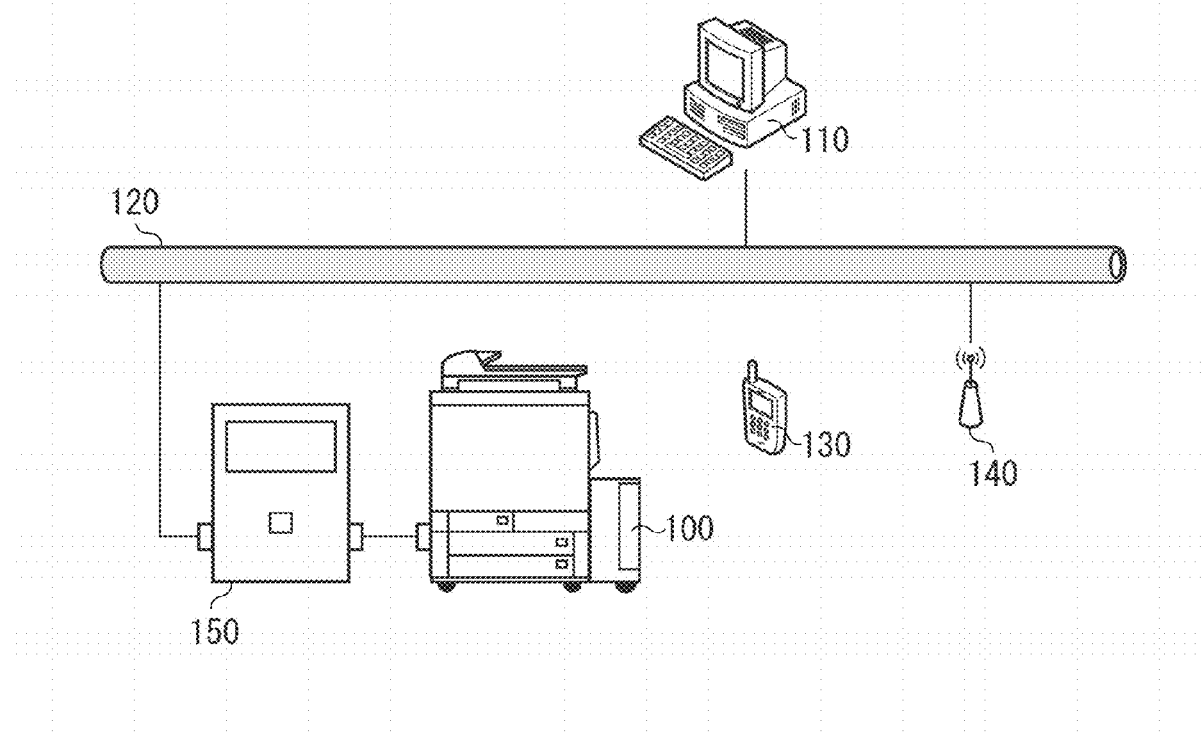

A first exemplary embodiment will be described below. A configuration of a printing system according to the present exemplary embodiment will be described below with reference to FIGS. 1A and 1B. FIG. 1A illustrates a configuration of the printing system in which a printing apparatus 100 is used alone. FIG. 1B illustrates a configuration of the printing system in which a print processing apparatus 150 is connected to the printing apparatus 100.

First of all, an operation form in which the printing apparatus 100 is used alone will be described below with reference to FIG. 1A. The printing apparatus 100 connected to a network 120 is able to communicate with an external apparatus such as a personal computer (PC) 110 and a portable terminal 130 via the network 120. The PC 110 transmits print data to the printing apparatus 100 via the network 120. The portable terminal 130 transmits print data to the printing apparatus 100 via an access point 140. Upon reception of the print data, the printing apparatus 100 performs print processing based on the received print data.

The printing apparatus 100 is able to perform NFC communication. When the user brings the portable terminal 130 close to the printing apparatus 100, the portable terminal 130 acquires communication information from the printing apparatus 100 via NFC. The communication information includes, for example, the IP address of the printing apparatus 100. After acquisition of the communication information, the portable terminal 130 switches the method of communication with the printing apparatus 100 from NFC to other communication method such as Wi-Fi, and transmits print data to a destination specified by the IP address included in the communication information. Thus, through a simple operation of bringing the portable terminal 130 close to the printing apparatus 100, the user of the portable terminal 130 is able to acquire the communication information required to transmit print data to the printing apparatus 100.

Another operation form in which the print processing apparatus 150 is connected to the printing apparatus 100 will be described below with reference to FIG. 1B. The printing apparatus 100 and the print processing apparatus 150 are connected with each other via a local area network (LAN) cable. Upon reception of print data transmitted from an external apparatus such as the PC 110 and portable terminal 130, the print processing apparatus 150 interprets the received print data, converts the interpreted print data to a format supported by the printing apparatus 100, and transmits the resultant print data to the printing apparatus 100. Upon reception of the print data transmitted from the print processing apparatus 150, the printing apparatus 100 performs print processing based on the received print data.

The print processing apparatus 150 is able to interpret PDL not supported by the printing apparatus 100. The print processing apparatus 150 converts interpreted print data into a format supported by the printing apparatus 100 and then transmits the resultant print data to the printing apparatus 100. Therefore, even if print data is originally described in PDL not supported by the printing apparatus 100, the printing apparatus 100 is able to receive from the print processing apparatus 150 the relevant print data in a format interpretable by the printing apparatus 100.

When the print processing apparatus 150 is connected to the printing apparatus 100, as illustrated in FIG. 1B, an external apparatus needs to transmit print data not to the printing apparatus 100 but to the print processing apparatus 150. Therefore, in the case of the operation form illustrated in FIG. 1B, if the printing apparatus 100 transmits the IP address of the printing apparatus 100 as communication information to the portable terminal 130 via NFC, the print data transmitted from the portable terminal 130 will not be sent to the print processing apparatus 150. Further, since the print data is not sent to the print processing apparatus 150, the print data will not be sent to the printing apparatus 100.

In the present exemplary embodiment, therefore, the printing apparatus 100 transmits suitable communication information to the portable terminal 130 via NFC in both a case where the print processing apparatus 150 is connected to the printing apparatus 100 and a case where the print processing apparatus 150 is not connected to the printing apparatus 100. More specifically, when the printing apparatus 100 is used alone without connecting the print processing apparatus 150 to the printing apparatus 100, as illustrated in FIG. 1A, the printing apparatus 100 selects the IP address of the printing apparatus 100 as communication information to be transmitted via NFC. On the other hand, when the print processing apparatus 150 is connected to the printing apparatus 100, as illustrated in FIG. 1B, the printing apparatus 100 selects the IP address of the print processing apparatus 150, not the IP address of the printing apparatus 100 as communication information to be transmitted via NFC.

A configuration of the printing apparatus 100 will be described below with reference to FIG. 2A. Although a multifunction peripheral is assumed as the printing apparatus 100 according to the present exemplary embodiment, a printer not provided with a scanner function may be used.

A central processing unit (CPU) 201 reads a control program stored in a read only memory (ROM) 202 and performs various processing for controlling operations of the printing apparatus 100. The CPU 201 is connected with other units via a bus 200. The ROM 202 stores a control program. A random access memory (RAM) 203 is used as a main memory and a temporary storage area (such as a work area) by the CPU 201. A hard disk drive (HDD) 204 stores various data such as print data and scan images.

In the case of the printing apparatus 100, although a single CPU 201 performs processing of flowcharts described below, other operation forms are also applicable. For example, it is possible that a plurality of CPUs performs processing of flowcharts described below in a collaborated way.

An NFC communication unit 205 performs NFC-based near field wireless communication with the portable terminal 130. The wireless communication performed by the NFC communication unit 205 is directly carried out between the printing apparatus 100 and the portable terminal 130 without intervention of a relay apparatus such as an access point.

The configuration of the NFC communication unit 205 will be described in more detail below with reference to FIG. 3. The NFC communication unit 205 includes an antenna 301, a controller 302, and a memory 303.

The antenna 301 operates to perform NFC-based wireless communication with an external apparatus. The controller 302 is connected to the bus 200, and controls operations of the antenna 301 and writes the communication information in the memory 303 according to an instruction of the CPU 201. Processing for storing the communication information in the memory 303 will be described in detail below with reference to the flowchart illustrated in FIG. 4. The memory 303 retains information (for example, the communication information) written by the controller 302.

Figure 2A:
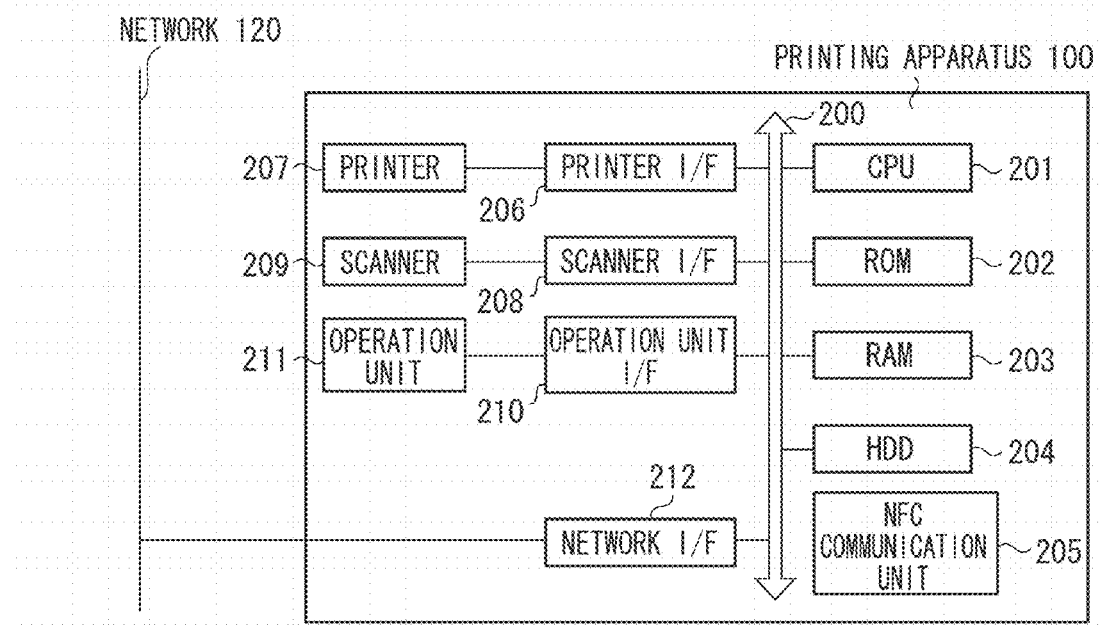
FIGS. 2A and 2B illustrate configurations of a printing apparatus.
Figure 2B:
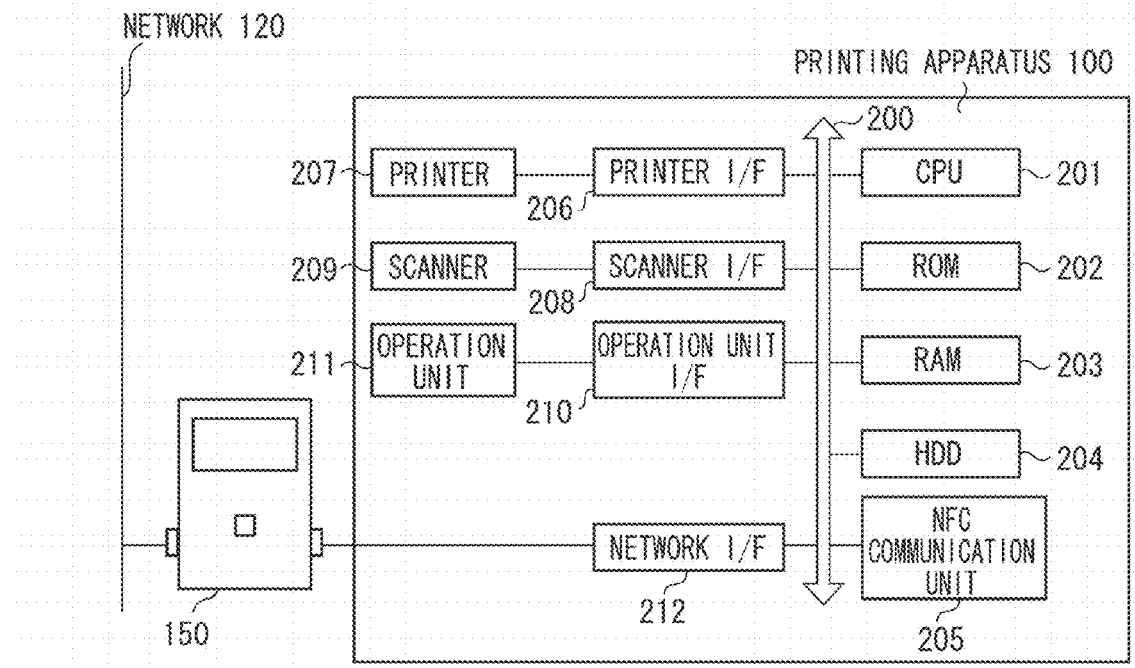

FIGS. 2A and 2B will be described below again. A printer interface (I/F) 206 connects a printer 207 with the bus 200. The printer 207 performs print processing on a sheet based on print data received from an external apparatus and a scan image generated by a scanner 209.

A scanner I/F 208 connects the scanner 209 with the bus 200. The scanner 209 reads a document to generate a scan image. The scan image generated by the scanner 209 is printed on the printer 207 or is stored in the HDD 204.

An operation unit I/F 210 connects the operation unit 211 with the bus 200. The operation unit 211 includes a liquid crystal display (LCD) having a touch panel function and a keyboard, and displays various operation screens. The user is able to input an instruction and information to the printing apparatus 100 via the operation unit 211.

A network I/F 212 connects with the network 120 to perform communication with an external apparatus on the network 120. The network I/F 212 receives print data transmitted from an external apparatus, and the printer 207 performs print processing based on the received print data.

FIG. 2A illustrates an operation form in which the printing apparatus 100 is used alone without connecting the print processing apparatus 150 to the printing apparatus 100. When the print processing apparatus 150 is connected to the printing apparatus 100, the operation form illustrated in FIG. 2B is used. The printing apparatus 100 and the print processing apparatus 150 are connected via a LAN cable.

The printing apparatus 100 writes the communication information in the memory 303 of the NFC communication unit 205. This communication information is read by the portable terminal 130 via NFC. The NFC communication unit 205 transmits the communication information stored in the memory 303 to the portable terminal 130 via NFC. The portable terminal 130 acquires the communication information and uses the IP address included in the communication information as a destination of print data.

Processing performed by the printing apparatus 100 to store the communication information in the memory 303 will be described below with reference to the flowchart illustrated in FIG. 4. Each step of the flowchart illustrated in FIG. 4 is processed when the CPU 201 loads a control program stored in a memory such as the ROM 202 into the RAM 203 and then executes the program. Processing of the flowchart illustrated in FIG. 4 describes initial processing to be performed when the power source of the printing apparatus 100 is turned ON.

When the power source of the printing apparatus 100 is turned ON, then in step S401, the CPU 201 of the printing apparatus 100 determines whether the print processing apparatus 150 is connected to the printing apparatus 100. The CPU 201 transmits via the network I/F 212 an inquiry packet for inquiring whether the print processing apparatus 150 is connected, and determines whether the print processing apparatus 150 is connected based on the presence or absence of a response to the inquiry packet. The method for determining whether the print processing apparatus 150 is connected is not limited to the method described in step S401. As another method, the CPU 201 may determine whether, for example, predetermined identification information indicating that the print processing apparatus 150 is connected is stored in a storage area such as the HDD 204 and, based on the result of the determination, make the determination in step S401.

When the CPU 201 determines that the print processing apparatus 150 is connected (YES in step S401), then in step S402, the CPU 201 identifies the IP address of the print processing apparatus 150 connected to the printing apparatus 100. According to the present exemplary embodiment, the IP address of the print processing apparatus 150 is included in a response packet to the inquiry packet transmitted in step S401. In step S402, the CPU 201 refers to the response packet to identify the IP address of the print processing apparatus 150 connected to the printing apparatus 100. The method for identifying the IP address of the print processing apparatus 150 is not limited to the method described in step S402. As another method, assuming that the user has registered the IP address of the print processing apparatus 150 in a storage area such as the HDD 204 of the printing apparatus 100, the CPU 201 may confirm the registered IP address to identify the IP address of the print processing apparatus 150.

The print processing apparatus 150 includes settings of at least two different IP addresses, i.e., the IP address to be used when communicating with an external apparatus on the network 120 and the IP address for communicating with the printing apparatus 100. Of these IP addresses, the IP address of the print processing apparatus 150 identified in step S402 is an IP address to be used by the print processing apparatus 150 to communicate with an external apparatus on the network 120.

After identifying the IP address of the print processing apparatus 150 in step S402, then in step S403, the CPU 201 generates the communication information by using the IP address of the print processing apparatus 150 identified in step S402. The communication information is generated in the NFC Data Exchange Format (NDEF) specified by the NFC standard. The IP address of the print processing apparatus 150 is included in the communication information as address information of the print processing apparatus 150. The format of the communication information is not limited to the NDEF and may be other formats.

After generating the communication information in step S403, then in step S404, the generated communication information is written in the memory 303 of the NFC communication unit 205. More specifically, the CPU 201 instructs the controller 302 of the NFC communication unit 205 to write the communication information in the memory 303, and the controller 302 writes the communication information in the memory 303.

The communication information written in the memory 303 in step S404 is transmitted to the portable terminal 130 via NFC. The portable terminal 130 acquires the communication information, extracts the address information included in the communication information, and uses the address information, for example, as a destination of print data.

The CPU 201 generates the communication information using the IP address of the print processing apparatus 150, not the IP address of the printing apparatus 100, in step S403 because the print processing apparatus 150 is connected to the printing apparatus 100, as illustrated in FIG. 1B. When the print processing apparatus 150 is connected to the printing apparatus 100, as illustrated in FIG. 1B, the portable terminal 130 needs to specify the print processing apparatus 150, not the printing apparatus 100, as a destination of print data. In the present exemplary embodiment, as illustrated in FIG. 1B, when the print processing apparatus 150 is connected to the printing apparatus 100, the printing apparatus 100 generates the communication information using the address information of the print processing apparatus 150, not the address information of the printing apparatus 100. Then, the printing apparatus 100 writes the generated communication information in the memory 303 of the NFC communication unit 205.

Return to Step S401. When the CPU 201 determines that the print processing apparatus 150 is not connected to the print apparatus 100 (NO in step S401), then in step S405, the CPU 201 generates the communication information using the IP address of the printing apparatus 100. After generating the communication information in step S405, then in step S404, the CPU 201 writes the communication information generated in step S405 in the memory 303 of the NFC communication unit 205.

The CPU 201 generates the communication information using the IP address of the printing apparatus 100 in step S405 because the printing apparatus 100 is used alone without connecting the print processing apparatus 150 to the printing apparatus 100, as illustrated in FIG. 1A. When the printing apparatus 100 is used alone, as illustrated in FIG. 1A, the portable terminal 130 needs to specify the printing apparatus 100 as a destination of print data. Therefore, in the present exemplary embodiment, when the printing apparatus 100 is used alone, as illustrated in FIG. 1A, the printing apparatus 100 generates the communication information using the address information of the printing apparatus 100, and writes the generated communication information in the memory 303 of the NFC communication unit 205.

Although the communication information is generated using the IP address of the print processing apparatus 150 or the printing apparatus 100 in steps S403 or S405, respectively, in the description above, other information may be used. For example, the communication information may be generated using the Media Access Control (MAC) address instead of the IP address or using both the IP address and the MAC address as the address information. Further, in addition to the address information, device information such as a device name may be included in the communication information.

Although the processing of the flowchart illustrated in FIG. 4 is described above as initial processing when power of the printing apparatus 100 is turned ON, the processing may be performed at other timing. For example, the processing may be performed when connection or disconnection of the LAN cable to the network I/F 212 is detected or when the printing apparatus 100 recovers from the power saving mode to the normal power mode.

According to the present exemplary embodiment as described above, the printing apparatus 100 is able to generate suitable communication information in both a case where the print processing apparatus 150 is connected to the printing apparatus 100 and a case where the print processing apparatus 150 is not connected to the printing apparatus 100. Thus, the portable terminal 130 which acquires the communication information via NFC is able to set a suitable address as a destination of print data in both a case where the print processing apparatus 150 is connected to the printing apparatus 100 and a case where the print processing apparatus 150 is not connected to the printing apparatus 100.

A second exemplary embodiment will be described below. The first exemplary embodiment has described a configuration in which the communication information is generated using the address information of the printing apparatus 100 or the print processing apparatus 150, and the generated communication information is transmitted to the portable terminal 130 via NFC. When the portable terminal 130 transmits print data according to the address information included in the communication information, the portable terminal 130 needs to connect with the access point 140 and exist in the same network as the printing apparatus 100. In other words, in a case where the portable terminal 130 is not connected with the same network as the printing apparatus 100, even if the portable terminal 130 acquires the communication information from the printing apparatus 100 via NFC, the portable terminal 130 is not able to transmit the print data to the printing apparatus 100 or the print processing apparatus 150.

The present exemplary embodiment is characterized in that information for connecting the portable terminal 130 to the network where the printing apparatus 100 exists is further included in the communication information to be written in the memory 303 of the NFC communication unit 205. More specifically, by including access point information for connecting with an access point in the communication information, the portable terminal 130 that acquires the communication information can be connected to the same network as the printing apparatus 100.

Figure 5:
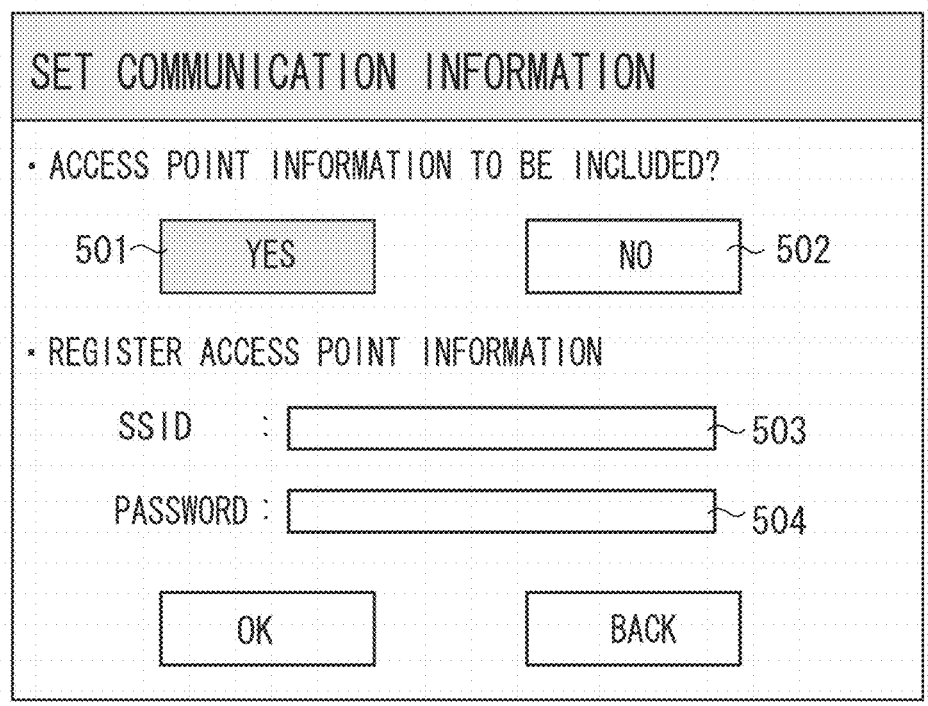
FIG. 5 illustrates a setting screen.

A setting screen 500 illustrated in FIG. 5 is displayed by the operation unit 211 of the printing apparatus 100. The user is able to register the access point information in the printing apparatus 100 by using the setting screen 500.

In the present exemplary embodiment, the user is able to determine whether to include the access point information in the communication information to be written in the memory 303 of the NFC communication unit 205. When the access point information is to be included in the communication information, the user selects an icon 501 (touches it in the case of a touch panel). On the other hand, when the access point information is not to be included in the communication information, the user selects an icon 502.

In an area 503, the user inputs the service set identifier (SSID) of an access point. The user inputs the SSID of the access point by using a software keyboard (not illustrated). In the present exemplary embodiment, the user inputs the SSID of an access point 140 existing in the same network as the printing apparatus 100. In an area 504, the user inputs a connection password for connecting with an access point. In the present exemplary embodiment, the user inputs a connection password for connecting with the access point 140 existing in the same network as the printing apparatus 100. Specifying the connection password is not mandatory and therefore the user does not need to specify a connection password in the setting screen 500.

The resultant settings in the Setting Screen 500 are stored as setting information in a memory such as the HDD 204.

When the access point information is included in the communication information to be written in the memory 303 of the NFC communication unit 205, the portable terminal 130 is able to connect with the access point 140. The portable terminal 130 is able to connect with the access point 140 even if the user of the portable terminal 130 does not know the SSID or the connection password of the access point 140. Thus, the convenience for the user of the portable terminal 130 can be improved. For this reason, to improve the convenience of the user operating the portable terminal 130, the user only needs to select the icon 501 to include the access point information in the communication information.

On the other hand, if the access point information is included in the communication information to be written in the memory 303 of the NFC communication unit 205, many portable terminals are able to connect with the access point 140 to participate in the network 120. In an operating environment where such a state is not desirable from the viewpoint of security, the user needs to select the icon 502 not to include the access point information in the communication information.

Processing performed when the printing apparatus 100 writes the communication information in the memory 303 will be described below with reference to the flowchart illustrated in FIG. 6. Each step of the flowchart illustrated in FIG. 6 is processed when the CPU 201 loads a control program stored in a memory such as the ROM 202 into the RAM 203 and then executes the program. Processing of the flowchart illustrated in FIG. 6 is performed at the same timing as the processing of the flowchart illustrated in FIG. 4.

In step S601, the CPU 201 of the printing apparatus 100 determines whether the print processing apparatus 150 is connected to the printing apparatus 100. The processing in step S601 is similar to the processing in step S401 illustrated in FIG. 4, accordingly, descriptions thereof will be omitted.

When the CPU 201 determines that the print processing apparatus 150 is connected to the printing apparatus 100 (YES in step S601), the processing proceeds to step S602. In step S602, the CPU 201 identifies the IP address of the print processing apparatus 150 connected to the printing apparatus 100. The processing in step S602 is similar to the processing in step S402 illustrated in FIG. 4, accordingly, descriptions thereof will be omitted.

In step S603, the CPU 201 determines whether the access point information is to be included in the communication information. In step S603, the CPU 201 determines whether the access point information is to be included in the communication information with reference to the setting information stored in a memory such as the HDD 204. When the CPU 201 determines that the access point information is to be included in the communication information (YES in step S603), the processing proceeds to step S604. In step S604, the CPU 201 generates the communication information using the IP address of the print processing apparatus 150 identified in step S602 and using preset access point information. Similar to step S403, the communication information is generated in the NDEF. In step S609, the CPU 201 writes the communication information generated in step S604 in the memory 303 of the NFC communication unit 205.

On the other hand, when the CPU 201 determines that the access point information is not to be included in the communication information (NO in step S603), the processing proceeds to step S605. Then in step S605, the CPU 201 generates the communication information using the IP address of the print processing apparatus 150 identified in step S602. The access point information is not included in the communication information generated in step S605. In step S609, the CPU 201 writes the communication information generated in step S605 in the memory 303 of the NFC communication unit 205.

Return to Step S601. When the CPU 201 determines that the print processing apparatus 150 is not connected (NO in step S601), the processing proceeds to step S606. In step S606, the CPU 201 determines whether the access point information is to be included in the communication information. The processing in step S606 is performed similarly to the processing performed in step S603.

When the CPU 201 determines that the access point information is to be included in the communication information (YES in step S606), the processing proceeds to step S607. Then in step S607, the CPU 201 generates the communication information using the IP address of the printing apparatus 100 and preset access point information. In step S609, the CPU 201 writes the communication information generated in step S607 in the memory 303 of the NFC communication unit 205.

On the other hand, when the CPU 201 determines that the access point information is not to be included in the communication information (NO in step S606), the process proceeds to step S608. In step S608, the CPU 201 generates the communication information using the IP address of the printing apparatus 100. The access point information is not included in the communication information generated in step S608. In step S609, the CPU 201 writes the communication information generated in step S608 in the memory 303 of the NFC communication unit 205.

According to the present exemplary embodiment described above, the access point information for connecting with an access point can further be added to the communication information to be transmitted to the portable terminal 130 via NFC. Thus, even if the user of the portable terminal 130 does not know the SSID or connection password of an access point, the portable terminal 130 is able to connect with the access point. Further, if the access point indicated by the access point information exists in the same network as the printing apparatus 100, the portable terminal 130 is able to participate in the same network as the printing apparatus 100 and then transmit print data to the printing apparatus 100 or the print processing apparatus 150.

According to the present exemplary embodiment, the user (for example, a system administrator) can select whether to include the access point information in the communication information to be transmitted to the portable terminal 130 via NFC depending on the operating environment of the printing apparatus 100.

Although, in the above-described exemplary embodiments, NFC is used as near field wireless communication performed by the printing apparatus 100, other wireless communication (for example, Bluetooth (registered trademark)) may be used.

At least one function of the above-described exemplary embodiments can be achieved by supplying a program to a system or apparatus via a network or storage medium, and at least one processor in a computer of the system or apparatus reads and executes the program. The above-described exemplary embodiments can also be achieved by a circuit (for example, an application specific integrated circuit (ASIC)) for implementing at least one function.

According to the present disclosure, it is possible to suitably switch information to be transmitted to an external apparatus via near field wireless communication such as NFC between a case where a print processing apparatus is connected to a printing apparatus and a case where the print processing apparatus is not connected to the printing apparatus.

OTHER EMBODIMENTS

Additional exemplary embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-151204, filed Jul. 24, 2014, which is hereby incorporated by reference herein in its entirety.

What is claimed is:

1. A printing apparatus comprising:
a printer that performs print processing;
an NFC communicator that has a memory, and performs a wireless communication based on NFC;
a storage device that stores instructions; and
a processor that executes the instructions to:
determine whether a print processing apparatus for processing print data is connected to the printing apparatus;
write, into the memory of the NFC communicator, first communication information which includes an address of the printing apparatus, in a case where it is determined that the print processing apparatus is not connected to the printing apparatus; and
write, into the memory of the NFC communicator, second communication information which includes an address of the print processing apparatus and does not include the address of the printing apparatus, in a case where it is determined that the print processing apparatus is connected to the printing apparatus.

2. The printing apparatus according to claim 1, wherein each of the first communication information and second communication information further includes an SSID of an access point.

3. The printing apparatus according to claim 1, wherein
the address of the printing apparatus included in the first communication information is an IP address of the printing apparatus, and
the address of the print processing apparatus included in the second communication information is an IP address of the print processing apparatus.

4. The printing apparatus according to claim 1, wherein
the address of the printing apparatus included in the first communication information is a MAC address of the printing apparatus, and
the address of the print processing apparatus included in the second communication information is a MAC address of the print processing apparatus.

5. A method for a print apparatus that includes a printer to perform print processing, an NFC communicator having a memory and which performs wireless communication using NFC and a storage device, the method comprising:
determining whether a print processing apparatus for processing print data is connected to the printing apparatus;
writing, into the memory of the NFC communicator, first communication information which includes an address of the printing apparatus, in a case where it is determined that the print processing apparatus is not connected to the printing apparatus; and
writing, into the memory of the NFC communicator, second communication information which includes an address of the print processing apparatus and does not include the address of the printing apparatus, in a case where it is determined that the print processing apparatus is connected to the printing apparatus.

* * * * *